(12) United States Patent
Lin

(10) Patent No.: US 9,081,158 B2
(45) Date of Patent: Jul. 14, 2015

(54) OPTICAL FIBER CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 125 days.

(21) Appl. No.: 13/866,035

(22) Filed: Apr. 19, 2013

(65) Prior Publication Data

US 2014/0064670 A1 Mar. 6, 2014

(30) Foreign Application Priority Data

Aug. 29, 2012 (TW) .............................. 101131270 A

(51) Int. Cl.
*G02B 6/42* (2006.01)
(52) U.S. Cl.
CPC ............ *G02B 6/4292* (2013.01); *G02B 6/4278* (2013.01)
(58) Field of Classification Search
CPC ................................ G02B 6/42; G02B 6/4278
USPC ...................................................... 385/79, 78
See application file for complete search history.

(56) References Cited

U.S. PATENT DOCUMENTS

| | | | | |
|---|---|---|---|---|
| 5,155,784 A * | 10/1992 | Knott | | 385/88 |
| 6,334,784 B1 * | 1/2002 | Howard | | 439/260 |
| 6,588,943 B1 * | 7/2003 | Howard | | 385/88 |
| 7,215,883 B1 * | 5/2007 | Lewis | | 398/25 |
| 8,541,736 B2 * | 9/2013 | Baba et al. | | 250/239 |
| 2002/0126967 A1 * | 9/2002 | Panak et al. | | 385/101 |
| 2005/0226570 A1 * | 10/2005 | Togami et al. | | 385/92 |
| 2011/0017046 A1 * | 1/2011 | Stockli | | 84/422.4 |
| 2011/0229089 A1 * | 9/2011 | Isenhour et al. | | 385/78 |
| 2011/0305417 A1 * | 12/2011 | Wang et al. | | 385/39 |
| 2012/0018624 A1 * | 1/2012 | Baba et al. | | 250/214.1 |
| 2012/0099099 A1 * | 4/2012 | Tudury et al. | | 356/73.1 |
| 2012/0127748 A1 * | 5/2012 | Kim | | 362/555 |
| 2012/0224817 A1 * | 9/2012 | Hayashi | | 385/93 |
| 2012/0251056 A1 * | 10/2012 | Tanaka et al. | | 385/88 |
| 2013/0136400 A1 * | 5/2013 | Isenhour et al. | | 385/79 |
| 2013/0163938 A1 * | 6/2013 | Wang et al. | | 385/89 |
| 2014/0133803 A1 * | 5/2014 | Rosenberg et al. | | 385/33 |

* cited by examiner

*Primary Examiner* — Kaveh Kianni
(74) *Attorney, Agent, or Firm* — Novak Druce Connolly Bove + Quigg LLP

(57) ABSTRACT

An optical fiber connector includes an optical cable and a connector body connected to the optical cable. The connector body includes a shell, a PCB, photoelectric elements, and a coupler. The shell includes a receiving portion and a plug portion connected to the receiving portion. The receiving portion defines a receiving space therein, and the plug portion defines an opening communicating with the receiving space. The receiving portion includes a bottom plate and an opposite top plate. The receiving portion defines a connecting hole in the top plate and communicating with the receiving space, and an end of the optical cable is received and fixed in the connecting hole. The PCB includes a mounting end positioned in the receiving portion and an insertion end extending to the plug portion through the opening. The photoelectric elements are positioned on the mounting end and faces toward the top plate.

4 Claims, 4 Drawing Sheets

OPTICAL FIBER CONNECTOR

BACKGROUND

1. Technical Field

The present disclosure relates to connectors and, particularly, to an optical fiber connector for an optical communication apparatus.

2. Description of Related Art

Optical fiber connectors are configured for connecting optical fibers to corresponding photoelectric elements. An optical fiber connector generally includes a connector shell, an optical cable connected to the connector shell, a printed circuit board (PCB) received in the connector shell, a number of photoelectric elements positioned on a surface of the PCB, and a coupler for optically coupling the optical cable with the photoelectric elements. Generally, a transmitting direction of optical signals in the optical cable is substantially parallel to the surface of the PCB, and the photoelectric elements emit/receive optical signals with a transmitting direction substantially perpendicular to the surface of the PCB. Therefore, a transmitting direction of the optical signals should be deflected for substantial 90 degrees by a deflecting structure, thus the optical cable and the photoelectric elements can be optically coupled with each other. The deflecting structure is typically formed on the coupler. However, the deflecting structure will bring difficulty in manufacturing and increase the cost of the coupler.

What is needed therefore is an optical fiber connector with the optical coupling lens addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
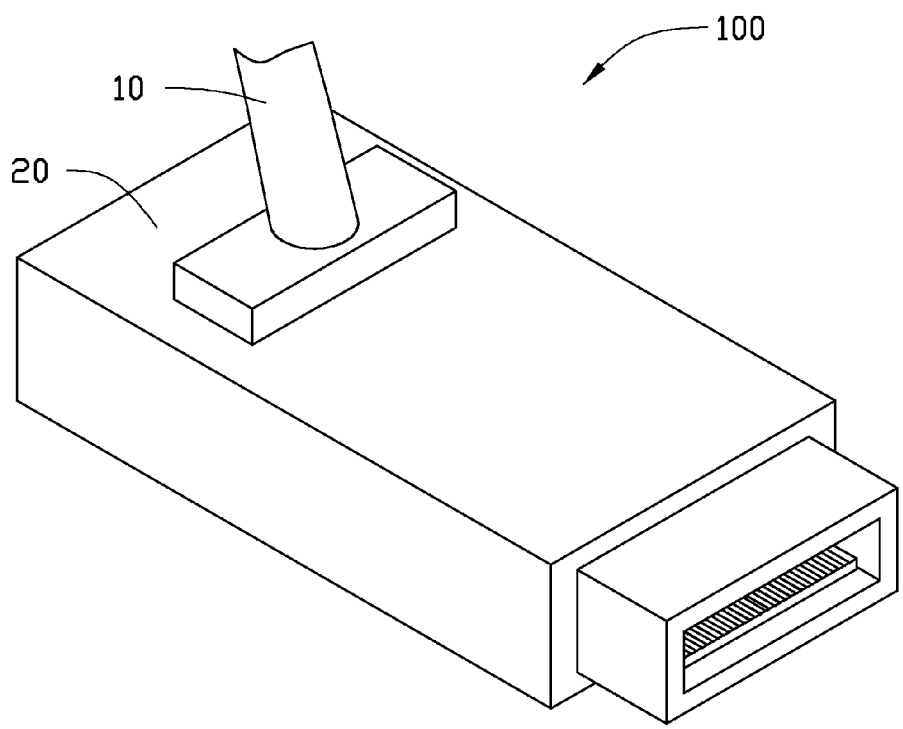
FIG. 1 is an isometric view of an optical fiber connector, according to an exemplary embodiment of the present disclosure.
Figure 2:
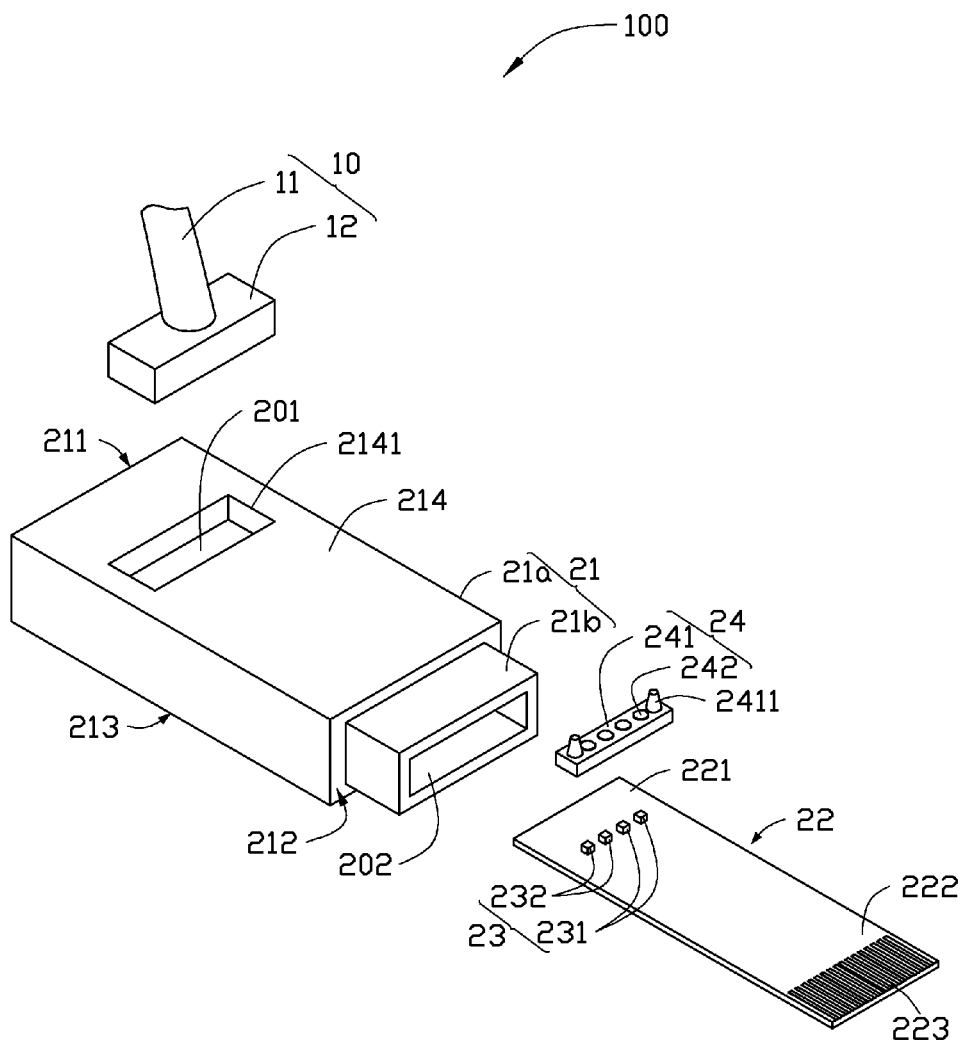
FIG. 2 is an exploded view of the optical fiber connector of FIG. 1, which includes a connecting portion and a coupler.
Figure 3:
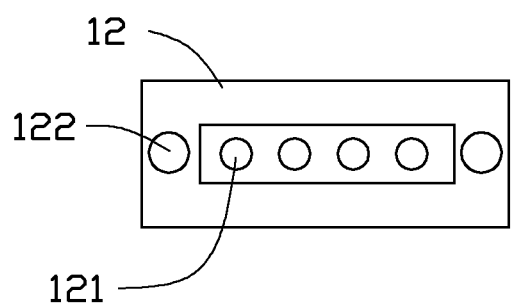
FIG. 3 is a bottom view of the connecting portion of FIG. 1.
Figure 4:
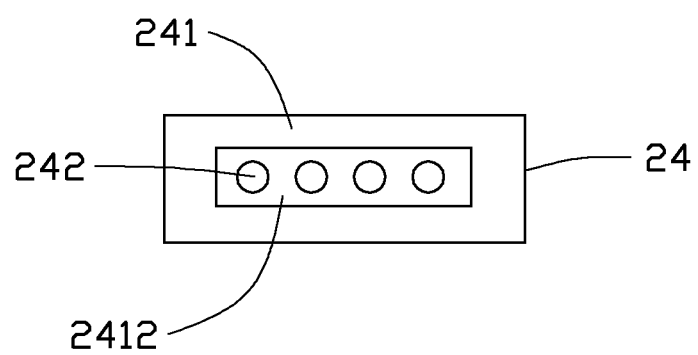
FIG. 4 is a bottom view of the coupler of FIG. 1.

FIGS. 1-4 show an optical fiber connector 100, according to an exemplary embodiment. The optical fiber connector 100 includes an optical cable 10 and a connector body 20 connected to an end of the optical cable 10.

The optical cable 10 includes a cable portion 11 and a connecting portion 12 connected to an end of the cable portion 11. The cable portion 11 includes a number of optical fibers (not shown) therein, and the optical fibers each provide an optical transmitting channel for optical signals. The connecting portion 12 connects the cable portion 11 to the connector body 20. The connecting portion 12 defines a number of fixing holes 121 and two engaging holes 122 in a bottom surface thereof. Each fixing hole 121 is corresponding to an optical fiber and serves as an inlet/outlet of a corresponding optical transmitting channel. An end of each optical fiber is fixed in a corresponding fixing hole 121. In this embodiment, the fixing holes 121 and the engaging holes 122 are arranged along a linear direction, and the engaging holes 122 are positioned at two opposite outer sides of the fixing holes 121.

The connector body 20 includes a shell 21, a PCB 22, a number of photoelectric elements 23, and a coupler 24.

The shell 21 includes a receiving portion 21a and a plug portion 21b connected to an end of the receiving portion 21a. The receiving portion 21a is substantially rectangular-shaped. The receiving portion 21a includes a first end wall 211, a second end wall 212 opposite to the first end wall 211, a bottom plate 213, and a top plate 214 opposite to the bottom plate 213. The first end wall 211 is substantially parallel to the second end wall 212, the bottom plate 213 is substantially parallel to the top plate 214, and the first end wall 211 and the second end wall 212 are perpendicularly connected to the bottom plate 213 and the top plate 214. The first end wall 211, the second wall 212, the bottom plate 213, and the top plate 214 cooperatively define a receiving space 201 for receiving the PCB 22, the photoelectric elements 23 and the coupler 24 therein. The receiving portion 21a defines a connecting hole 2141 in the top plate 214 for receiving and fixing the connecting portion 12 of the optical cable 10. The connecting hole 2141 communicates with the receiving space 201.

The plug portion 21b is formed on the second end wall 212. The plug portion 21b defines an opening 202 communicating with the receiving space 201. In this embodiment, the opening 202 is substantially rectangular-shaped.

The PCB 22 includes a mounting end 221 and an insertion end 222 connected to the mounting end 221. The insertion end 222 includes a number of electrical connecting pins 223 positioned thereon. The optical connector 100 is electrically connected to other electronic devices (not shown) via the electrical connecting pins 223. The PCB 22 is received in the shell 21, the mounting end 221 is positioned on a surface of the bottom plate 213 of the receiving portion 21a, and the insertion end 222 extends into the plug portion 21b through the opening 202.

The photoelectric elements 23 are positioned on the mounting end 221 of the PCB 22 and face toward the top plate 214. The number of the photoelectric elements 23 is corresponding to the number of the optical fibers contained in the optical cable 10. In this embodiment, the photoelectric elements 23 include two optical signal emitters 231 and two optical signal receivers 232. The optical signal emitters 231 and the optical signal receivers 232 are arranged along a linear direction corresponding to the fixing holes 121 of the connecting portion 12. In this embodiment, the optical signal emitters 231 are laser diodes, and the optical signal receivers 232 are photodiodes.

Alternatively, the optical connector 100 may include only one optical signal emitter 231, one optical signal receiver 232, or one optical signal emitter 231 and one optical signal receiver 232.

The coupler 24 is positioned on the mounting end 221 of the PCB 22 and covers the photoelectric elements 23. The coupler 24 couples optical signals between the optical cable 10 and the photoelectric elements 23. The coupler 24 includes a main body 241, and a number of lens portions 242 formed on the main body 241. The main body 241 is substantially rectangular-shaped. The main body 241 includes two engaging posts 2411 formed on two opposite sides of a surface thereof. The engaging posts 2411 are corresponding to the engaging holes 122. Each engaging post 2411 is engaged into a corresponding engaging hole 122, and each lens portion 242 is optically aligned with a corresponding optical fiber and photoelectric element 23. The main body 241 defines a recess portion 2412 in a bottom surface thereof. The main body 241 covers the photoelectric elements 23 within the recess portion 2412. In this embodiment, the lens portions 242 are convex lenses, and the lens portions 242 are integrally formed with the main body 241.

In this embodiment, the optical connector 100 contains two optical input channels and two optical output channels. In use, the optical signal emitters 231 emits optical signals to the corresponding lens portions 242, the optical signals pass through the corresponding lens portions 242 along a linear direction and then enter into the corresponding optical fibers; and the optical signal receiver 232 receives optical signals from corresponding optical fibers, and the optical signals pass through the coupler 24 along a linear direction. Therefore, the optical connector 100 does not need a reflecting structure on the coupler 24 to deflect a transmitting direction of light signals, and the difficulty in manufacture and cost of the coupler 24 is accordingly decreased.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical fiber connector, comprising:
    an optical cable; and
    a connector body connected to an end of the optical cable, the connector body comprising:
        a shell comprising a receiving portion and a plug portion connected to an end of the receiving portion, the receiving portion defining a receiving space therein, the plug portion defining an opening communicating with the receiving space, the receiving portion comprising a bottom plate and a top plate opposite to the bottom plate, the receiving portion defining a connecting hole in the top plate communicating with the receiving space, and the end of the optical cable being received and fixed in the connecting hole;
        a PCB received in the shell, the PCB comprising a mounting end and an insertion end opposite to the mounting end, the mounting end being positioned on the bottom plate, and the insertion end extending to the plug portion through the opening;
        at least one photoelectric element positioned on the mounting end of the PCB, the at least one photoelectric element facing toward the top plate; and
        a coupler positioned between the optical cable and the at least one photoelectric element for optically aligning the optical cable with the at least one photoelectric element;
    wherein the optical cable comprises a cable portion and a connecting portion connected to an end of the cable portion, and the connecting portion is received and fixed in the connecting hole;
    wherein the coupler comprises a main body and at least one lens portion formed on the main body, the at least one lens portion is corresponding to the at least one photoelectric element and is optically aligned with the at least one photoelectric element;
    wherein the coupler comprises two engaging posts on two opposite sides of a surface of the main body, the connecting portion defines two engaging holes spatially corresponding to the engaging posts, and the engaging posts are engaged into the engaging holes, respectively.

2. The optical fiber connector of claim 1, wherein the at least one photoelectric element comprises two optical signal emitters and two optical signal receivers, the optical signal emitters and the optical signal receivers are arranged along a linear direction, the connecting portion defines four fixing holes, each of the fixing holes is corresponding to a respective one of the optical signal emitters and the optical signal receivers.

3. The optical fiber connector of claim 2, wherein the optical signal emitters are laser diodes, and the optical signal receivers are photodiodes.

4. The optical fiber connector of claim 1, wherein the main body defines a recess portion in its bottom surface, and the main body covers the at least one photoelectric element within the recess portion.

* * * * *